United States Patent

Monk et al.

Patent Number: 6,040,679
Date of Patent: Mar. 21, 2000

[54] VARIABLE CAPACITY COMPRESSOR HAVING TWO-STEP MOTOR STRENGTH ADJUSTABILITY

[75] Inventors: David T. Monk, Lebanon; Joe T. Hill, Bristol, both of Va.; Phillip C. Wagner, Bristol, Tenn.; Joseph F. Loprete, Bristol, Tenn.; Michael R. Young, Bristol, Tenn.

[73] Assignee: Bristol Compressors, Inc., Bristol, Va.

[21] Appl. No.: 09/019,834

[22] Filed: Feb. 6, 1998

[51] Int. Cl.[7] .................................................... H02P 1/26
[52] U.S. Cl. ............................................ 318/778; 318/766
[58] Field of Search ..................................... 318/786, 785, 318/778, 794, 704, 768–784, 254, 788, 766; 417/423.7

[56] References Cited

U.S. PATENT DOCUMENTS

| 4,236,874 | 12/1980 | Sisk | 417/315 |
|---|---|---|---|
| 4,245,966 | 1/1981 | Riffe | 417/539 |
| 4,248,053 | 2/1981 | Sisk | 62/158 |
| 4,396,359 | 8/1983 | Kropiwnicki | 417/312 |
| 4,472,670 | 9/1984 | Stanley | 318/774 |
| 4,479,419 | 10/1984 | Wolfe | 92/13.3 |
| 4,494,447 | 1/1985 | Sisk | 92/13.3 |
| 4,503,371 | 3/1985 | Sugita | 318/443 |
| 4,687,982 | 8/1987 | Palaniappan | 318/763 |
| 4,767,293 | 8/1988 | Caillat et al. | 418/55 |
| 4,838,769 | 6/1989 | Gannaway | 417/312 |
| 5,129,792 | 7/1992 | Abousabha | 417/312 |
| 5,201,640 | 4/1993 | Heinzelmann et al. | 417/312 |
| 5,345,126 | 9/1994 | Bunch | 310/68 |
| 5,483,139 | 1/1996 | Welles, II | 318/778 |
| 5,617,001 | 4/1997 | Nacewicz et al. | 318/788 |
| 5,650,697 | 7/1997 | Imagi et al. | 318/254 |

OTHER PUBLICATIONS

Instructions, Champagne Astro☆Stat Low Voltage Multi--Stage Thermostats (Heating, Cooling, and Heating–Cooling), White Rodgers, The "Total Concept" People.
Product Information, Definite Purpose Controls, Contactors, Starters, 2–Speed Controller, General Electric, GEA–11540B.
Fowler, Richard J., *Electricity Principles and Applications*, McGraw–Hill Book Company, 1979, pp. 440–451.
Warner Installation and Operation Manual, SECO® AC Drive, SL3000 Series AC Motor Drives, 1–5 HP 230 VAC, 1–15 HP 460 VAC, Warner Electric®.

*Primary Examiner*—Bentsu Ro
*Assistant Examiner*—Rita Levkin
*Attorney, Agent, or Firm*—Finnegan, Henderson, Farabow, Garrett & Dunner, L.L.P.

[57] ABSTRACT

An electrical control system for a variable capacity compressor having an A/C motor is provided. The control system includes a first circuit that has a start winding in series with a capacitor, a second circuit that has a main winding. The control system also includes a third circuit that includes the start winding and a fourth circuit that includes the main winding in series with the capacitor. There is also provided a power supply line that provides power to each of the circuits. The control system further includes a first switch and a second switch, both of which are responsive to loading conditions. The first switch operates to connect the first and second circuits with the power supply line to run the compressor for high load operation and the second switch operates to connect the third and fourth circuits with the power supply line to run the compressor for partial load operation.

5 Claims, 3 Drawing Sheets

VARIABLE CAPACITY COMPRESSOR HAVING TWO-STEP MOTOR STRENGTH ADJUSTABILITY

BACKGROUND OF THE INVENTION

1. Field of the Invention

The present invention relates to an electrical control system for adjusting the strength and speed of electrical drive motors of all types and phase wiring for any type of use and load. More particularly, the present invention relates to an electrical control system for a variable capacity compressor such as a scroll or rotary compressor wherein the eccentric of the compressor crankshaft is functionally connected to a unidirectionally operable orbiting scroll by a bearing or other type connector means or a reciprocating piston compressor typically used in single or multiple cylinder refrigeration, air conditioning systems or heat pumps or the like. It is contemplated that the control system of the present invention may also be used with a vacuum or other similar pumps or machines.

2. Description of the Related Art

Such variable capacity compressors are exemplified by the scroll compressor of U.S. Pat. No. 4,767,293, wherein the said connector means comprises the crankpin 126, the drive bushing 122, the bore 120, and the hub 118. Other compressors are exemplified by the wobble plate compressor of U.S. Pat. No. 5,129,792, the scotch yoke compressor of U.S. Pat. No. 4,838,769, and the reciprocating piston compressor of U.S. Pat. No. 5,238,370, the disclosures of all of which exemplary patents are hereby incorporated herein by reference in their entireties.

In all of such compressors it is often desirable to vary the compressor output, i.e., compressor capacity modulation, in accordance with cooling load requirements. Such modulation allows large gains in efficiency while normally providing reduced sound, improved reliability, and improved creature comforts including one or more of reduced air noise, better de-humidification, warmer air in heat pump mode, or the like.

Various approaches disclosed in the literature for achieving modulation in reciprocating piston compressors has been to switch the stroke length, i.e., stroke, by reversal of the motor and crankshaft rotation and the use of an eccentric bushing, of one or more of the reciprocating pistons whereby the volumetric capacity of the cylinder is changed. In these compressors the reciprocating motion of the piston is effected by the orbiting of a crankpin, i.e., crankshaft eccentric, which is attached to the piston by a connecting rod means of any of a variety of structures or configurations and which has a bearing in which the eccentric is rotatably mounted. Such switching devices are disclosed for example in U.S. Pat. Nos. 4,494,447; 4,236,874; 4,245,966; 4,479,419; and 4,248,053. It is apparent that such mechanical means would have no applicability to scroll compressors having the aforesaid unidirectionally operable scroll.

SUMMARY OF THE INVENTION

A principal object therefore, of the present invention, is to provide an electric motor strength and speed control system which is non-complex, which has great reliability of operation over long periods of use, which can be manufactured at greatly reduced expense, and which provides a two step motor control while holding the volts/hertz ratio substantially constant and maintaining a consistent motor rotation direction. Accordingly, the present invention is directed to a control system for a variable capacity compressor that provides two-step motor strength adjustability.

To attain the advantages and in accordance with the purposes of the invention, as embodied and broadly described herein, the present invention is directed to a control system for a variable capacity compressor. The control system includes a first circuit having a start winding in series with a capacitor and a second circuit having a main winding. The second circuit operates in parallel with the first circuit to operate the compressor at a high load. The control system also includes a third circuit having the start winding and a fourth circuit having a main winding in series with said capacitor. The fourth circuit operates in parallel with the first circuit to operate the compressor at a partial load. A power supply line is connected to each of said circuits to provide power thereto. There is also provided a first switch responsive to loading conditions and operable to connect the first and second circuits with the power supply line to provide a first motor strength and speed to run the compressor for high load operation. There is further provided a second switch responsive to loading conditions and operable to connect the third and fourth circuits with the power supply line to provide a second motor strength and speed to run the compressor for partial load operation.

BRIEF DESCRIPTION OF THE DRAWINGS

The invention will be understood further from the drawings herein and the description thereof, wherein equivalent electrical components and circuitry are numbered the same.

DETAILED DESCRIPTION OF THE DRAWINGS

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, there is provided a control system for a variable capacity compressor. It is contemplated that the present invention may be used with variable capacity compressors, vacuum or other pumps, or any other machine wherein it is desired to vary the motor strength and speed. For purposes of the present disclosure, the control system of the present invention will be described in connection with a variable capacity compressor. It is contemplated that the compressor may be any compressor, including but not limited to a scroll compressor, a rotary compressor, or a reciprocating piston compressor that is used in air conditioning systems or heat pumps or the like, wherein the drive input of the compressor is functionally connected to a unidirectionally operable crankshaft.

As is further described below, the control system is operable to change the motor strength and speed depending upon loading conditions of the compressor. A first embodiment of the control system of the present invention is illustrated in FIGS. 1 and 2.

Figure 1:
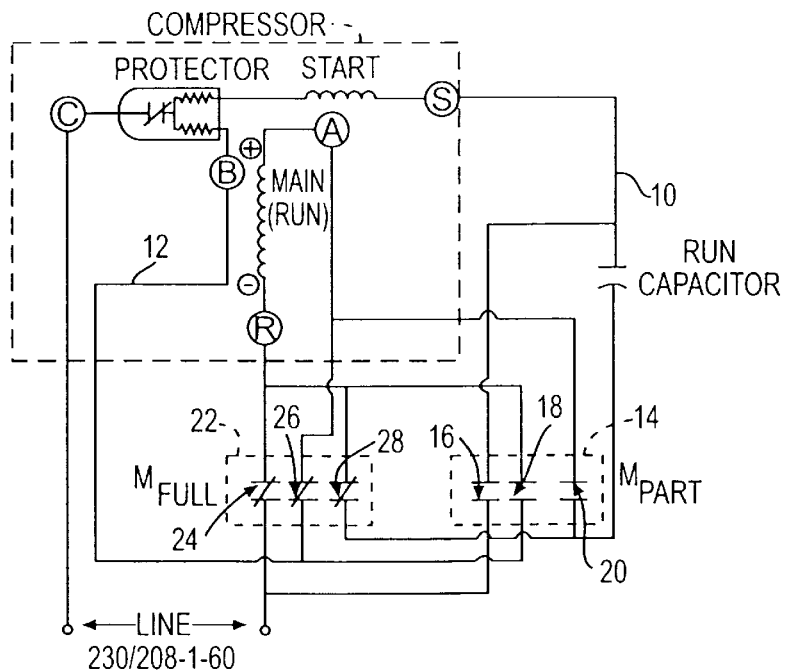
FIG. 1 is an electrical schematic of one embodiment of the present motor electrical control system in its high load mode and having a potential relay.

As illustrated in FIG. 1, the control system includes a start winding, a main or run winding, a run capacitor, a first switch 22, and a second switch 14. These elements are interconnected by lines A, B, C, R, and S. Switches 14 and 22 are configured to alter the connections of these elements to vary the strength and speed of the associated motor between high load operation and partial load operation. The strength and speed of the associated motor is reduced by switching the operable circuitry of the compressor to place the run capacitor in series with the main, or run, windings of the compressor without reversing the operating direction of the motor. The amount of reduction in the motor strength and speed is dependent upon the capacitance of the run capacitor.

Referring to FIG. 1, where the control system is configured to operate at high load conditions, the first circuit 10 and second circuit 12 in FIG. 1 are shown opened at the partial load or second switching means 14 at low contacts 16, 18 and 20 and closed at the high load or first switching means 22 at high contacts 24, 26 and 28. This operational first mode places the run capacitor in its conventional series conjunction with the start winding, with the polarity of the main and start windings (EMF direction) arbitrarily shown as being directed from + to −. Since the run capacitor is not in series with the main windings, the motor operates at its full or high capacity.

Figure 2:
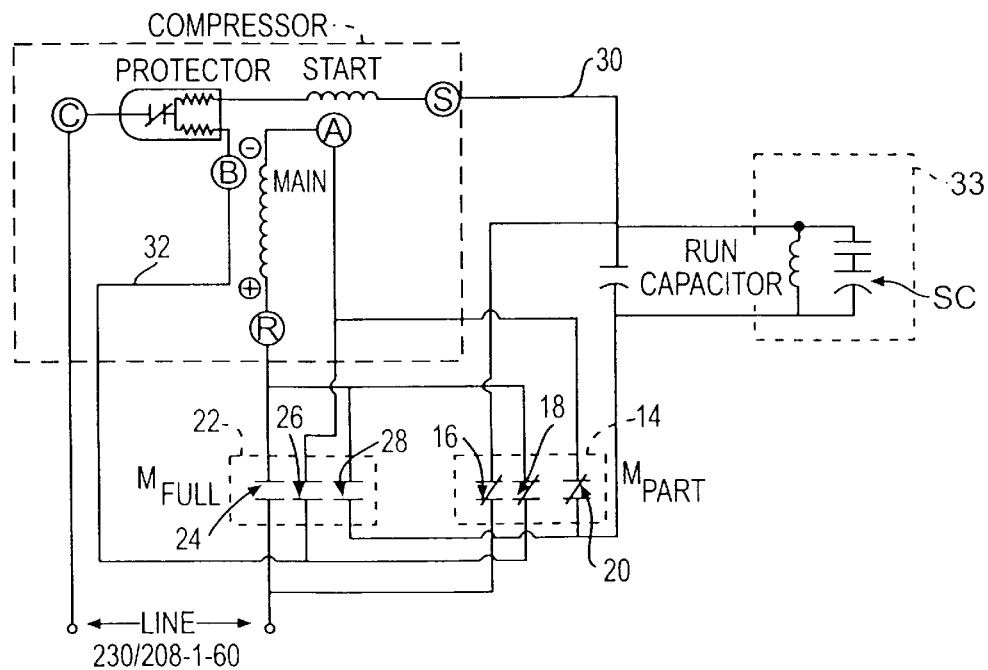
FIG. 2 is a schematic of the system of FIG. 1 in its partial or low load mode with a reversal of main winding polarity.

As illustrated in FIG. 2, the connections of switches 14 and 22 have been switched. In this configuration, the third circuit 30 and fourth circuit 32 have been brought on line for partial load operation and the first and second circuits are now off line. This operational second mode places the run capacitor in non-conventional series connection with the main winding as one event and reverses the main winding polarity as indicated as a concomitant event. Including the run capacitor in series connection with the main winding results in a reduced motor strength and speed and reversing the polarity of the main winding prevents the motor from reversing direction.

Placing the capacitor in series with the main winding and reversing the polarity of the main winding in this manner also maintains the same motor rotation. Both said events are preferably carried out within a short period of time of, for example, about 0.5 second such that the compressor does not stop the motor. However, if the compressor does stop, starting assists such as a 2 or 3 wire potential relay generally designated 33 across the run capacitor may be employed in the system to restart the motor and compressor against any retained pressure within the compressor.

It is particularly noted that the switching means embodiment shown in the drawings wherein all of the contacts for each mode are shown as being in the same switching means or device, i.e., either 14 or 22, is exemplary only. It is contemplated that, for example, all of the contacts may be on separate actuators such as solenoids or solid state relay systems, or all on a single actuator such that the making or breaking for both modes necessarily occurs essentially simultaneously.

By reversing the polarity (EMF direction) of the main or start winding substantially simultaneously with each operation of said switching means, the motor rotation remains unidirectional.

Figure 3:
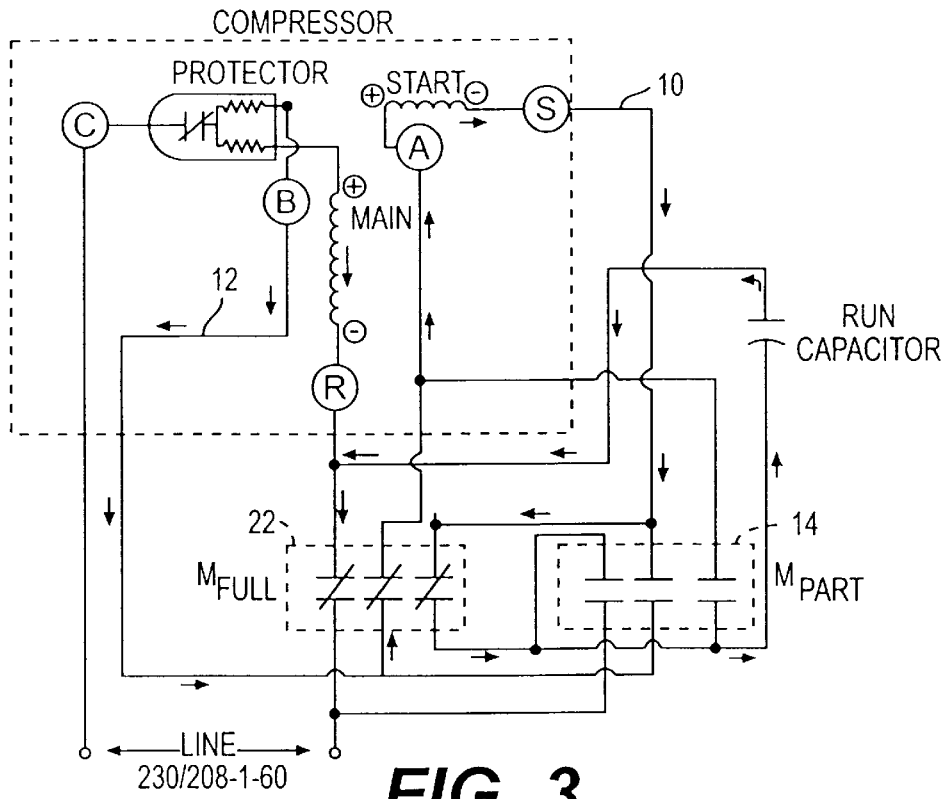
FIG. 3 is an electrical schematic of an alternative embodiment of the present motor electrical control system in its high load mode.
Figure 4:
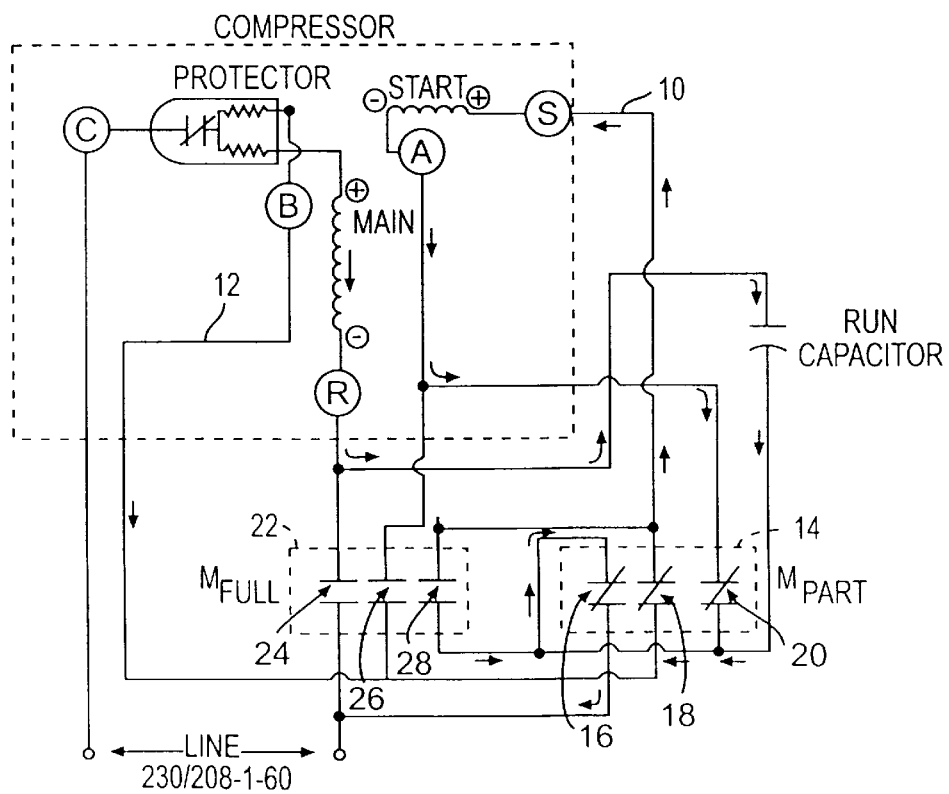
FIG. 4 is a schematic of the system of FIG. 3 in its partial or low mode with a reversal of start winding polarity.

An alternative embodiment of the present invention is illustrated in FIGS. 3 and 4. In this embodiment, the operation and function of the first and second switches, 14 and 22, respectively, is also to place the run capacitor in series with the main windings to achieve partial load operation of the motor. However, the polarity of the start winding, rather than the polarity of the main winding, is reversed. The effect of the polarity switch of the start winding prevents the motor from reversing direction. Thus, the reversal of the start winding polarity, in combination with shifting the capacitor into series with the main winding, gives the same result as for FIGS. 1 and 2.

Figure 5:
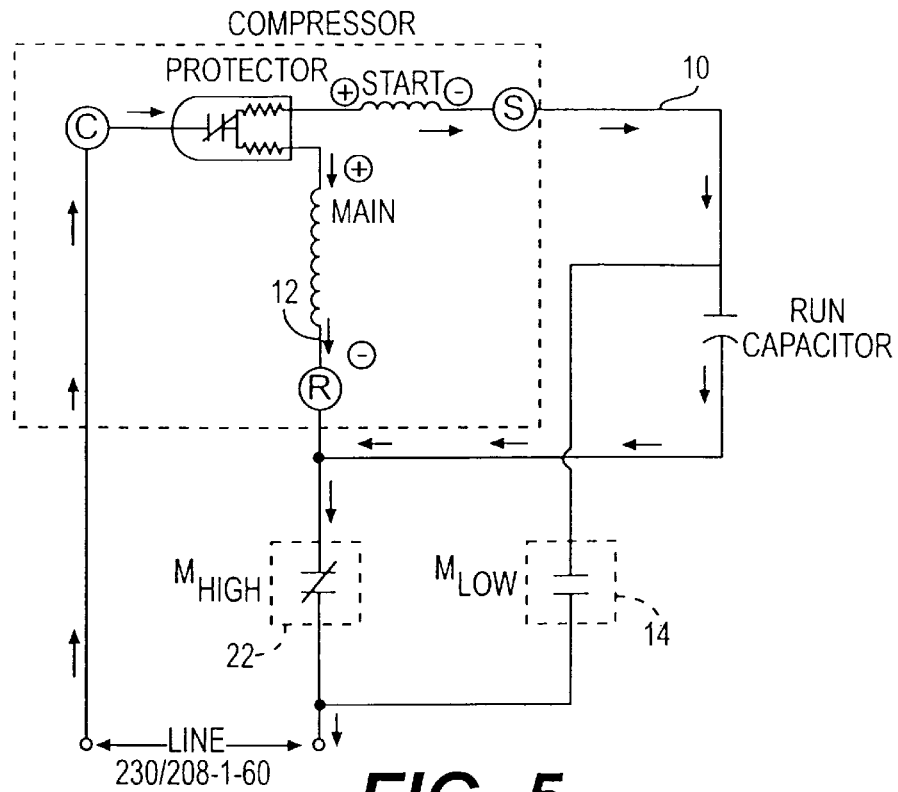
FIGS. 5 and 6 show schematically an alternative system which employs run capacitor rapid shifting without polarization reversal.
Figure 6:
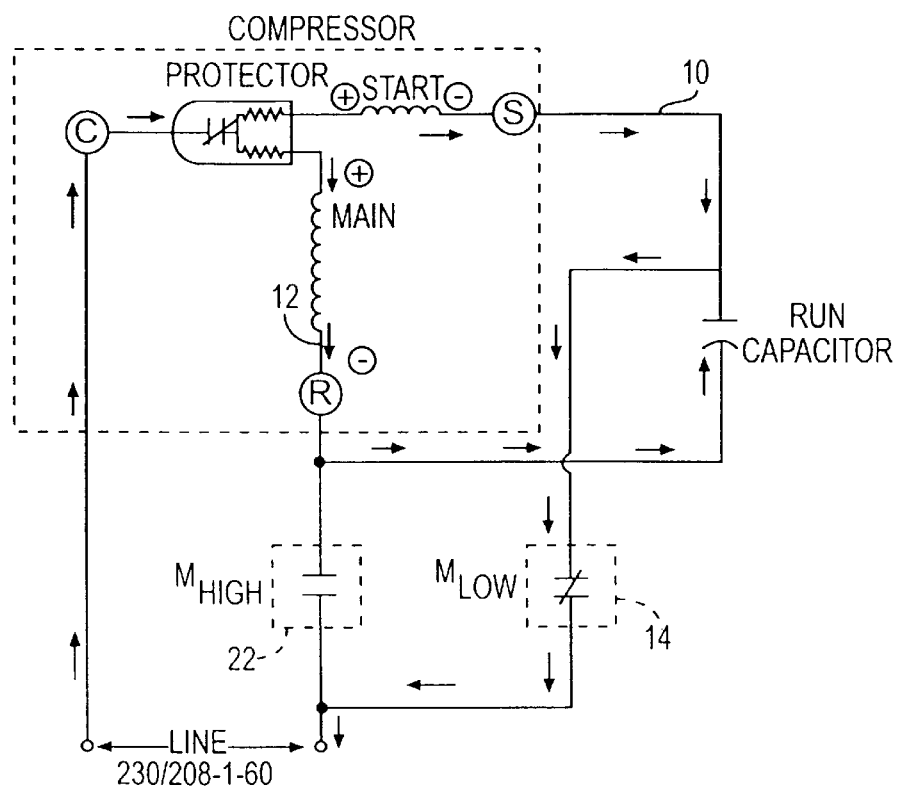

Another alternative embodiment of the present invention is illustrated in FIGS. 5 and 6. In this embodiment, the circuitry of the control system is essentially the same as in FIGS. 1–4. Operation of switches 14 and 22 switches current flow through the system to place the run capacitor in series with the main winding. However, the polarity of both the main and start windings remain constant and are not reversed as in the previous embodiments. In this embodiment, motor reversal is prevented by shifting the capacitor into series with the main winding very rapidly, e.g., 20–150 milliseconds or so, such that the compressor load does not reduce the motor speed below its breakdown or stall speed which typically is somewhere around 3,000 rpm, but which can vary considerably depending on motor type, compressor operating pressures, and other such parameters and conditions, both structural and electrical. Such switching means would include solid state devices such as thyristors, triacs or the like, particularly where the switching needs to be done faster than indicated above.

Preferably, the three high 24, 26, and 28 and three low 16, 18, 20 contacts of each switch 14 and 22 are closed or opened in turn by any of a variety of solenoid type of contactors or switches such as are readily commercially available as per the General Electric "Definite Purpose Controls" Product Information catalogue, 23 pages, GEA-11540B 4/87 15M 1800, which publication is hereby incorporated herein by reference in its entirety.

The contacts of each switch are preferably actuated at the appropriate temperature by a two stage thermostat such as available from the WHITE-ROGERS DIVISION of Emerson Electric Co. and described in detail in the four page INSTRUCTIONS booklet, PART No. 37-3421, which publication is hereby incorporated by reference in its entirety. Preferably, switches 14 and 22 are either opened or closed depending on the temperature sensed by the thermostat. The sensed temperature will indicate whether the compressor should operate at high load or operate at partial load or be switched from one mode of operation to the other.

The reciprocating piston type compressor which is believed to be best suited for this application has the following structure and operating characteristics:

| | |
|---|---|
| (a) Size (capacity) | 3 TON |
| (b) Cylinder No. | 2 |
| (c) Cylinder Displacement | 3.34 in$^3$/rev. |
| (d) Stroke (piston) | 0.805 in. |
| (e) Electrical Drive Motor - GE model 0434A, 1φ, PSC induction AC | |
| (f) Electrical Motor Strength - 252 oz. ft. Max./90 oz. ft. rated load | |
| (g) Run Capacitor | 45 μF/370 VAC |
| (h) Speed (rated load) | 3500–3550 rpm |

The scroll type compressor which is believed to be best suited for this application has substantially the same constitution as items (a) and (e) thru (h) above, with the scroll continuum, i.e., pressure chambers producing substantially the same discharge volume and pressure per motor revolution as for the compressor given above.

The invention has been described in detail with particular reference to preferred embodiments thereof, but it will be understood that variations and modifications will be effected with the spirit and scope of the invention.

We claim:

1. A control system for a variable capacity compressor having an A/C motor, comprising:

a first circuit having a start winding in series with a capacitor;

a second circuit having a main winding;

a third circuit having said start winding;

a fourth circuit having the main winding in series with said capacitor;

a power supply line connected to each of said circuits to provide power thereto;

a first switch responsive to loading conditions and operable to place the first and second circuits in parallel with the power supply line to run the compressor for high load operation; and a second switch responsive to loading conditions and operable place the third and fourth circuits in parallel with the power supply line to run the compressor for partial load operation.

2. The control system of claim 1, wherein the first and second switches reverse the polarity of the main winding when the operation of the compressor is switched from one of the high load and partial load operations to the other.

3. The control system of claim 1, wherein the first and second switches reverse the polarity of the start winding when the operation of the compressor is switched from one of the high load and partial load operations to the other.

4. The control system of claim 1, wherein the first and second switches operate to switch between operational modes at sufficiently high motor speeds to prevent reversal of the motor while also preventing stalling of the motor.

5. The control system of claim 1 wherein the variable capacity compressor is a scroll type compressor including a rotatable drive shaft and the partial load operation is achieved by reducing the rotation rate of the drive shaft.

* * * * *